United States Patent [19]

Jae-Gyun

[11] Patent Number: 5,311,301
[45] Date of Patent: May 10, 1994

[54] APPARATUS FOR AUTOMATICALLY DISCRIMINATING BETWEEN AT LEAST THREE DIFFERENT BROADCASTING SYSTEMS

[75] Inventor: Hong Jae-Gyun, Suwon, Rep. of Korea

[73] Assignee: Samsung Electronics Co., Ltd., Kyonggi, Rep. of Korea

[21] Appl. No.: 23,677

[22] Filed: Feb. 26, 1993

[30] Foreign Application Priority Data

Feb. 28, 1992 [KR] Rep. of Korea .................. 92-3247

[51] Int. Cl.$^5$ .................................. H04N 11/20
[52] U.S. Cl. .................................. 348/453; 348/708
[58] Field of Search .................. 358/11, 140, 139, 10, 358/21 R; H04N 11/20, 5/46

[56] References Cited

U.S. PATENT DOCUMENTS

| | | | |
|---|---|---|---|
| 4,414,563 | 11/1983 | Juhnke et al. | 358/21 R |
| 4,688,082 | 8/1987 | Kato | 358/21 R |
| 4,933,749 | 6/1990 | Van Lammeren et al. | 358/23 |
| 5,119,177 | 6/1992 | Lim | 358/21 R |

FOREIGN PATENT DOCUMENTS 4-103288 4/1992 Japan .

OTHER PUBLICATIONS

"Engineer's Mini-Notebook Digital Logic Circuits" by Forrest M. Mims III, Copyright 1986.

Primary Examiner—Victor R. Kostak
Assistant Examiner—Nathan J. Flynn
Attorney, Agent, or Firm—Sughrue, Mion, Zinn, Macpeak & Seas

[57] ABSTRACT

An automatic broadcasting system discriminating apparatus includes: a first status detecting circuit for discriminating the broadcasting system by utilizing color burst signals; a second status detecting circuit for discriminating the broadcasting system by utilizing synchronizing signals; and a third status detecting circuit for discriminating the broadcasting system in accordance with the outputs of the first and second status detecting circuit in order to discriminate automatically one of the NTSC system, PAL-M system and PAL-N systems from among the received broadcasting signals.

3 Claims, 5 Drawing Sheets

Burst recognizing pulse

Output of inverter circuit

Output of clamping circuit

Output of first mono-stable multivibrator

Output of first integrating circuit

NTSC, PAL-M SYNC

1/60 SEC

BISTABLE MULTIVIBRATOR OUTPUT

1/60 SEC
$T_1 = 1/30$ SEC

SECOND MONOSTABLE MULTIVIBRATOR OUTPUT

1/60 SEC
$T_2 = 1/30$ SEC

PAL-N SYNC.

BISTABLE MULTIVIBRATOR OUTPUT

SECOND MONOSTABLE MULTIVIBRATOR OUTPUT

EXCLUSIVE OR GATE OUTPUT

THIRD MONOSTABLE MULTIVIBRATOR OUTPUT

SECOND INTEGRATING CKT. OUTPUT

APPARATUS FOR AUTOMATICALLY DISCRIMINATING BETWEEN AT LEAST THREE DIFFERENT BROADCASTING SYSTEMS

FIELD OF THE INVENTION

The present invention relates to an apparatus for automatically discriminating between three different broadcasting systems in an image signal processing system, such as a television or VCR, and particularly to such an apparatus in which the broadcasting systems NTSC, PAL-M, PAL-N and the like are automatically discriminated. The present disclosure is based on the disclosure of Korean Patent Application No. 92-3247 filed Feb. 28, 1992, which disclosure is incorporated herein by reference.

BACKGROUND OF THE INVENTION

Generally, broadcasting systems such as NTSC (National Television System Committee), PAL (Phase Alternation by Line), and SECAM (Sequence De Couleurs Avec Memoirs) are used.

Japanese Patent Laid-Open No. Hei-4-103288 (entitled "NTSC/PAL Signals Discriminating Circuit, And Active Filter Using This Discriminating Circuit") discloses a technique as described below. Large signals are generated in correspondence with an input signal, and then, based on the magnitude of the generated large signals, a discrimination is made as to whether the input signal is an NTSC sub-carrier signal or a PAL carrier signal. Then the reference discloses the technique of carrying out adjustments for the required processing under the respective NTSC and PAL modes.

However, the PAL system includes the PAL-M system, PAL-N system, PAL-B system, and PAL-I system which have different functions.

Therefore, in a number of countries in which the television broadcasting is made based on the PAL-M system and the PAL-N system, a receiving system capable of receiving television signals based on the NTSC system, PAL-M system and PAL-N system was developed in order to receive the NTSC signals transmitted from the nearby countries.

However, in such a receiving system, a mechanical mode selecting switch such as a slide switch is used in selecting the modes of the NTSC system, PAL-M system and PAL-N system, since a circuit for automatically discriminating from among the three types of broadcasting systems is not known. Therefore there is the problem that users have to switch manually from among the modes by manipulating the mode selecting switch.

SUMMARY of THE INVENTION

Therefore, it is an object of the present invention to provide an automatic broadcasting system discriminating apparatus in which a circuit such as selecting switch is not used. Instead, the broadcasting system is enabled to be automatically selected in an image signal processing system capable of processing NTSC, PAL-M and PAL-N signals, by automatically discriminating from among the three broadcasting systems.

The present invention achieves the above and other objects by providing an apparatus which includes: a first status detecting circuit for discriminating the broadcasting system by utilizing color burst signals; a second status detecting circuit for discriminating the broadcasting system by utilizing synchronizing signals; and a third status detecting circuit for discriminating the broadcasting system based on the outputs of the first and second status detecting circuits.

BRIEF DESCRIPTION of THE DRAWINGS

The above object and other advantages of the present invention will become more apparent by describing in detail the preferred embodiment of the present invention with reference to the attached drawings in which.

DESCRIPTION of THE PREFERRED EMBODIMENT

Figure 1:
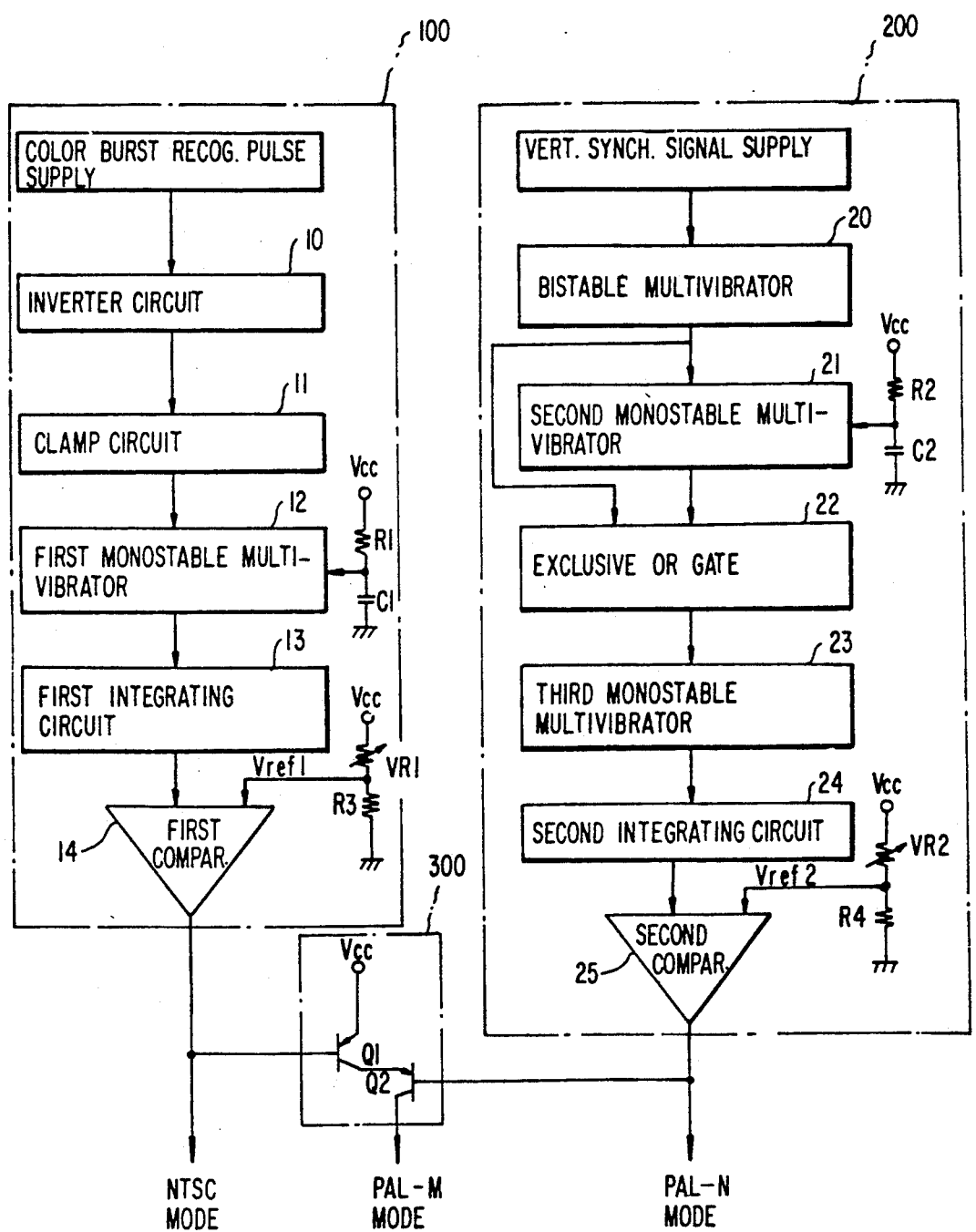
FIG. 1 is a block diagram showing the constitution of the automatic broadcasting system discriminating apparatus according to the present invention.

FIG. 1 illustrates the automatic broadcasting system discriminating apparatus according to an embodiment of the present invention, and the apparatus includes: a first status detecting circuit 100 for discriminating the broadcasting system based on color burst signals; a second status detecting circuit 200 for discriminating the broadcasting system based on synchronizing signals; and a third status detecting circuit 300 for discriminating the broadcasting system based on the output of the first and second status detecting circuits 100 and 200.

Referring to FIG. 1, the first status detecting circuit 100 includes: an inverter circuit 10 for inverting the phase of color burst recognizing pulses; a clamping circuit 11 for removing signals of a certain level from the output signals of the inverter circuit 10; a first mono-stable multi-vibrator 12 for outputting rectangular signals having a certain duty ratio in accordance with the output signals of the clamping circuit 11; a first integrating circuit 13 for integrating the rectangular signals of the first mono-stable multi-vibrator 12; and a first comparator 14 for outputting broadcasting discriminating signals by comparing the output signals of the first integrating circuit 13 with a reference voltage.

The second status detecting circuit 200 includes: a bistable multi-vibrator 20 for outputting rectangular signals in accordance with the synchronizing signals of the image signals; a second mono-stable multi-vibrator 21 for outputting rectangular signals having a certain duty ratio in accordance with the output signals of the bistable multi-vibrator 20; an exclusive OR gate 22 for receiving the output signals of the bistable multi-vibrator 20 and the output signals of the second mono-stable multi-vibrator 21 to output logic signals; a third mono-stable multi-vibrator 23 for outputting rectangular signals in accordance with the output signals of the exclusive OR gate 22; a second integrating circuit 24 for integrating the rectangular output signals of the third mono-stable multi-vibrator 23; and a second comparator 25 for comparing the output signals of the second integrating circuit 24 with a reference voltage to output broadcasting system discriminating signals.

The third status detecting circuit 300 includes first and second transistors Q1 and Q2 which output discriminating signals by being controlled by the output signals of the first status detecting circuit 100 (which discriminates the broadcasting system based on the color burst signals), and by the output signals of the second status detecting circuit 200 (which discriminates the broadcasting system based on the synchronizing signals).

Figure 2A:
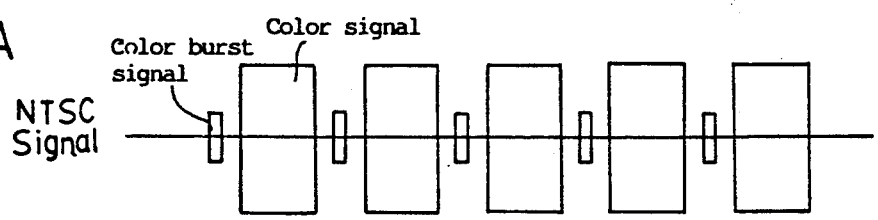
FIGS. 2A-2F show the operation of a first status detecting circuit when an NTSC signal is received.

If a broadcast is received in a region using the NTSC system, there are received NTSC signals consisting of color burst signals and color signals as shown in FIG. 2A.

Of course, the above signals include horizontal and vertical synchronizing signals (not shown). If the signals as shown in FIG. 2A are received, the phase of the color burst signals is checked, and a color burst recognizing pulse as shown in FIG. 2B is generated by a well-known pulse generating integrated circuit (IC) (not shown).

Figure 2B:
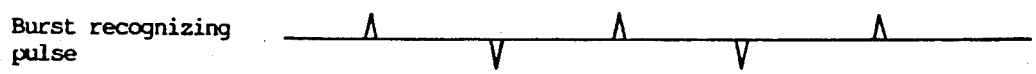
Figure 2C:
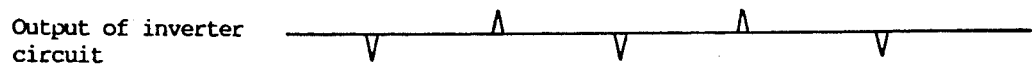
Figure 2D:
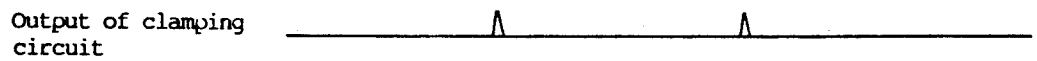

The color burst recognizing pulse as shown in FIG. 2B is inputted into the inverter circuit 10 of the first status detecting circuit 100. The inverter circuit 10 inverts the color burst recognizing pulse to output signals as shown in FIG. 2C. The output signals of the inverter circuit 10 are inputted into the clamping circuit 11. The clamping circuit 11 removes the negative level signals (signals less than zero volts) from the output signals of the inverter circuit 10, thereby outputting the signals as shown in FIG. 2D.

Figure 2E:

The output signals of the clamping circuit 11 are inputted into the first mon-stable multi-vibrator 12 in which the duty ratio is adjusted by its associated resistor R1 and capacitor C1. The first mono-stable multi-vibrator 12 which receives the pulse signals as shown in FIG. 2D outputs rectangular signals as shown in FIG. 2E.

Figure 2F:
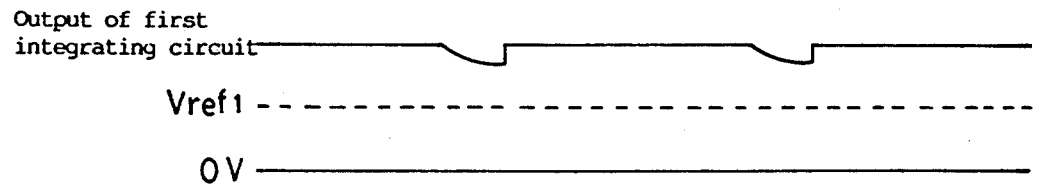

The output signals of the first mono-stable multi-vibrator 12 are inputted into the first integrating circuit 13 which integrates the output signals of the first mono-stable multi-vibrator 12 to output the signals as shown in FIG. 2F.

The output signals of the integrating circuit 13 are inputted into the first comparator 14 which compares the output signals of the first integrating circuit 13 with a reference voltage Vref1 as determined by a variable resistor VR1 and a resistor R3 as shown in FIG. 2F.

Under this condition, if the color burst signals which are inputted into the first status detecting circuit 100 are NTSC signals, the output signals of the first integrating circuit 13 become larger than the reference signal Vref1, and the first comparator 14 therefore outputs high level logic signals.

Figure 3A:
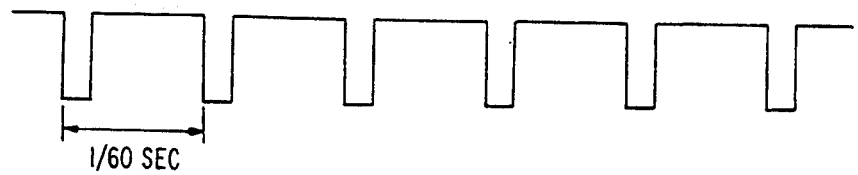
FIGS. 3A-3C show the operation of a second status detecting circuit when either an NTSC or a PAL-M signal is received.

When the NTSC signals are received, the second status detecting circuit 200 receives a vertical synchronizing signal of the NTSC format as shown in FIG. 3A, which is formed by being separated from the remainder of the NTSC signal by a synchronizing signal separating circuit (not shown).

Figure 3B:
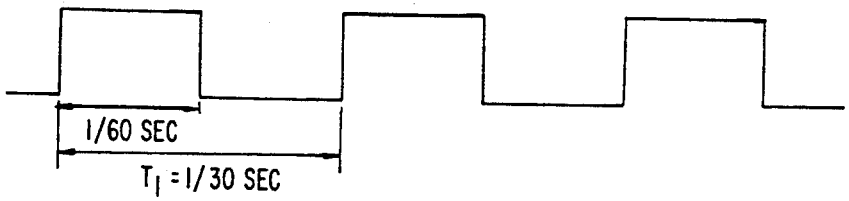

The NTSC vertical synchronizing signal as shown in FIG. 3A is inputted into the bistable multi-vibrator 20 which then outputs the rectangular signals as shown in FIG. 3B in accordance with the vertical synchronizing signal. The rectangular signals varies its logic level at the falling edge of the vertical synchronizing signal, and therefore, the period T1 is 1/30 seconds.

Figure 3C:
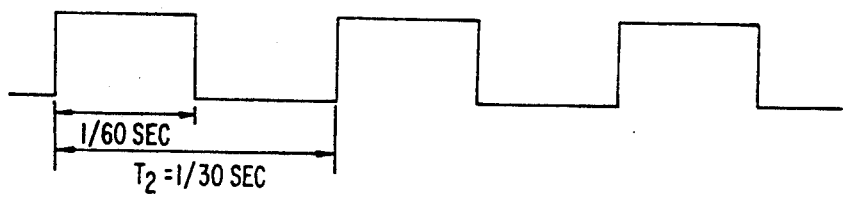

The output signals of the bistable multi-vibrator 20 are inputted into the second mono-stable multi-vibrator 21 which then outputs rectangular signals having a period T2 of 1/30 seconds as shown in FIG. 3C, the duty ratio of the rectangular signals being determined by a resistor R2 and a capacitor C2.

The output signals (FIG. 3C) of the second mono-stable multi-vibrator 21 together with the output signals (FIG. 3B) of the bistable multi-vibrator 20 are inputted into the exclusive OR gate 22. The exclusive OR gate 22 outputs high level logic signals when the levels of logic signals in the output of the bistable multi-vibrator 20 are different from the levels of logic signals in the output of the second mono-stable multi-vibrator 21.

However, when an NTSC signal is input, there is no difference in the logic level signals in the above-mentioned signals, and therefore the exclusive OR gate 22 outputs only low level signals. The low level logic signals which are outputted by the exclusive OR gate 22 are inputted into the third mono-stable multi-vibrator 23 which then further outputs low level logic signals.

The low level logic signals which are outputted from the third mono-stable multi-vibrator 23 are inputted into the second integrating circuit 24 which then further outputs low level logic signals.

The low level logic signals which are outputted from the second integrating circuit 24 are inputted into the second comparator 25 which then compares the output signals of the second integrating circuit 24 with a reference voltage Vref2 which is determined by the variable resistor VR2 and the resistor R4. Under this condition, as the output signals of the second integrating circuit 24 are low level logic signals, they are smaller in magnitude than the reference voltage Vref2. Therefore, the second comparator 25 outputs low level logic signals.

If the output signals of the second comparator 25 have the form of low level logic signals, then the second transistor Q2 of the third status detecting circuit 300 is turned on. However, the signals which are outputted from the first comparator 14 of the first status detecting circuit 100 are high level logic signals, and therefore, the first transistor Q1 of the third status detecting circuit 300 is turned off.

If the first transistor Q1 is turned off, then no voltage Vcc is supplied to the emitter terminal of the second transistor Q2, and therefore, the collector terminal of the second transistor Q2 outputs low level logic signals.

That is, if the NTSC broadcasting is received, high level logic signals are outputted only to the NTSC mode terminal, while low level logic signals are supplied to the PAL-M mode terminal and the PAL-N mode terminal. Thus, the NTSC system has been discriminated amongst the three types of broadcasting systems.

Figure 4A:
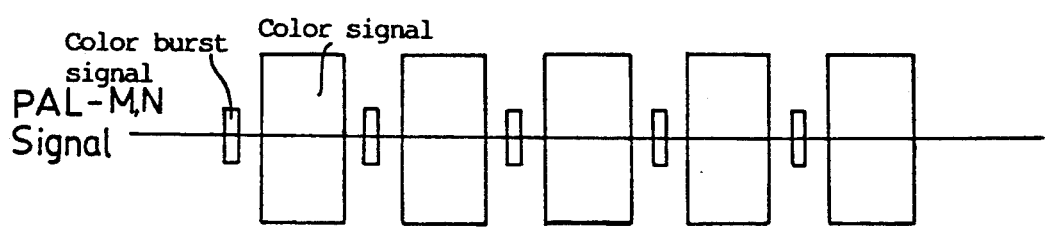
FIGS. 4A-4C show the operation of a first status detecting circuit when either a PAL-M or PAL-N signal is received.

On the other hand, if a broadcasting is received in an area in which the PAL-M system is used, there are received PAL-M signals which consist of color burst signals and color signals as shown in FIG. 4A. Of course, these signals also contain horizontal/vertical synchronizing signals (not shown).

Figure 4B:

If the PAL-M signals as shown in FIG. 4A are received, a color burst recognizing signal as shown in FIG. 4B is generated by the IC (not shown) which checks the phase of the color burst signals in order to output pulse signals.

Figure 4C:

The color burst recognizing pulses as shown in FIG. 4B are inputted into the inverter circuit 10 of the first status detecting circuit 100, so that the inverter circuit 10 can invert the color burst recognizing pulses to output the signals as shown in FIG. 4C. The output signals of the inverter circuit 10 are inputted into the clamping circuit 11 which then removes the negative level signals from the output of the inverter circuit 10.

Under this condition, the output signals of the inverter circuit 10 lack positive level signals, and therefore, the clamping circuit 11 which has removed the negative level signals outputs low level logic signals. That is, since the phase of the color burst signals does not change, and is always positive, the output of the inverter circuit will always be negative. Thus, the output of the clamp circuit 11 which removes all negative level signals, will be a logic low level (i.e., zero volts).

The output signals of the clamping circuit 11 are inputted into the first mono-stable multi-vibrator 12 which then adjusts the duty ratio by means of the resistor R1 and the capacitor C1. The first mono-stable multi-vibrator 12 outputs low level logic signals in accordance with the inputted low level logic signals.

Accordingly, the first integrating circuit 13 which integrates the output signals of the first mono-stable multi-vibrator 12 also outputs low level logic signals, while the first comparator 14 which compares the output of the first integrating circuit 13 with the reference voltage Vref1 also outputs low level logic signals.

In the case where the PAL-M broadcast is received, a vertical synchronizing signal which is as shown in FIG. 3A and which is separated from the rest of the PAL-M signal by a synchronizing signal separating circuit (not shown) is inputted into the second status detecting circuit 200. The vertical synchronizing signal of the PAL-M system has the same form as that of the NTSC system as shown in FIG. 3A. Thus, the signal processing which occurs is the same as that discussed above with respect to FIGS. 3A-3C and the NTSC signal. Therefore, the second comparator 25 outputs low level logic signals.

If the output of the second comparator 25 is outputted in the form of low level logic signals, then the second transistor Q2 of the third status detecting circuit 300 is turned on. Further, the output signals of the first comparator 14 of the first status detecting circuit 100 are low level logic signals, and the first transistor Q1 of the third status detecting circuit 300 is also turned on.

When the first and second transistors Q1 and Q2 are turned on, the voltage Vcc is supplied to the emitter terminal of the second transistor Q2, so that the collector terminal of the second transistor Q2 should output high level logic signals. That is, when the PAL-M broadcast is received, high level logic signals are outputted only from the PAL-M mode terminal, while low level logic signals are outputted from the NTSC mode terminal and the PAL-N mode terminal. Thus, the PAL-M system has been discriminated amongst the three types of broadcasting systems.

If a broadcast is received in a region where the PAL-N system is used, the PAL-N signals consisting of color burst signals and color signals as shown in FIG. 4A are received. The Pal-N signals are same as the PAL-M signals, as well as including horizontal and vertical synchronizing signals (not shown). Thus, the operation of the first status detecting circuit 100 is the same as that described above in conjunction with FIGS. 4A-4C for the PAL-M signals. Thus, when a signal of the PAL-N system is received, low level logic signals are output from first comparator 14.

Figure 5A:
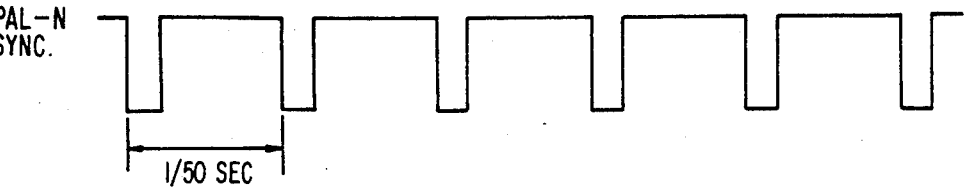
FIGS. 5A-5F show the operation of a second status detecting circuit when a PAL-N signal is received.

When the PAL-N broadcast is received, vertical synchronizing signals as shown in FIG. 5A, which are separated by a synchronizing signal separating circuit (not shown) are inputted into the second status detecting circuit 200.

Figure 5B:
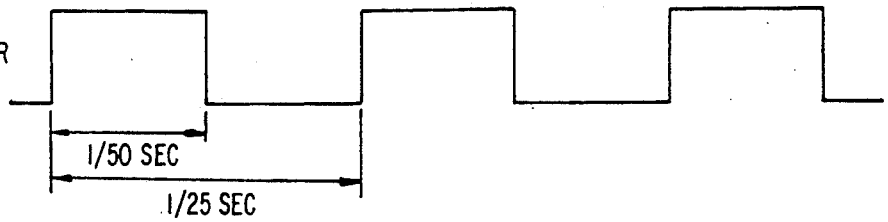

When the vertical synchronizing signals as shown in FIG. 5A are inputted into the bistable multi-vibrator 20 of the second status detecting circuit 200, the bistable multi-vibrator 20 outputs rectangular signals having a period T3 of 1/25 seconds as shown in FIG. 5B.

Figure 5C:
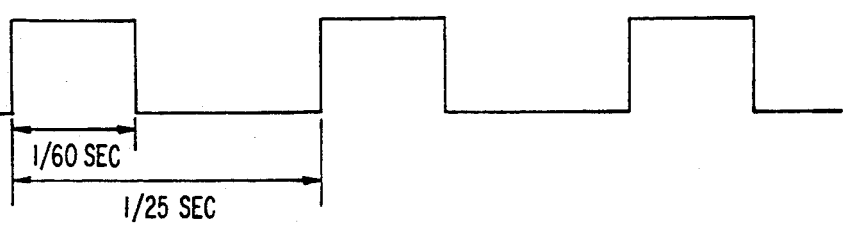

The output signals of the bistable multi-vibrator 20 are inputted into the second mono-stable multi-vibrator 21 which then outputs rectangular signals by deciding the duty ratio by means of the resistor R2 and the capacitor C2. In this case, the duty ratio is different from the rectangular signals as shown in FIG. 5C which are outputted from the bistable multi-vibrator 20.

The output signals of the second mono-stable multi-vibrator 21 together with the output signals of the bistable multi-vibrator 20 are inputted into the exclusive OR gate 22. The exclusive OR gate 22 outputs high level logic signals, when there are logic signals of different levels in the output of the bistable multi-vibrator 20 as shown in FIG. 5B and in the output of the second mono-stable multi-vibrator 21 as shown in FIG. 5C. Therefore, the output signals of the exclusive OR gate 22 become rectangular signals which are formed by the different duty ratios as shown in FIG. 5D.

Figure 5D:
Figure 5E:
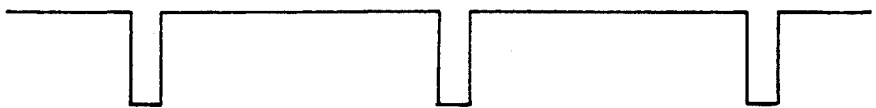

The rectangular pulse signals which are outputted from the exclusive OR gate 22 are inputted into the third mono-stable multi-vibrator 23 which then outputs rectangular signals as shown in FIG. 5E in accordance with the output signals of the exclusive OR gate 22 as shown in FIG. 5D.

Figure 5F:
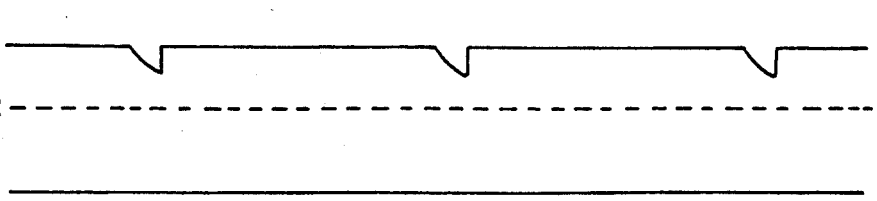

The output signals of the third mono-stable multi-vibrator 23 are inputted into the second integrating circuit 24 which then integrates the pulse signals to output the signals as shown in FIG. 5F.

The output signals of the second integrating circuit 24 are inputted into the second comparator 25 which then compares the output signals of the second integrating circuit 24 with a reference voltage Vref2 which is determined by the variable resistor VR2 and the resistor R4. Under this condition, the output signals of the second integrating circuit 24 are larger in magnitude than the reference voltage Vref2. Accordingly, the second comparator 25 outputs high level logic signals.

When the second comparator 25 outputs high level logic signals, the second transistor Q2 of the third status detecting circuit 300 is turned off. When the second transistor Q2 is turned off, the voltage Vcc is not supplied to the emitter terminal of the second transistor Q2, with the result that low level logic signals are outputted from the collector terminal of the second transistor Q2.

That is, when the PAL-N broadcast is received, low level logic signals are outputted from the NTSC mode terminal and the PAL-M mode terminal, i.e., from the output terminal of the first status detecting circuit 100, while high level logic signals are outputted from the PAL-N mode terminal.

The above details can be summarized as shown in Table 1 below.

TABLE 1

|  | NTSC Terminal | PAL-M Terminal | PAL-N Terminal |
| --- | --- | --- | --- |
| NTSC System | High | Low | Low |
| PAL-M System | Low | High | Low |
| PAL-N System | Low | Low | High |

As described above, the present invention makes it possible to automatically select one of the NTSC system, PAL-M system and PAL-N system by outputting discriminating signals.

In the above, descriptions were made based on the specific embodiment, but various modifications can be added without departing from the scope of the present invention.

Particularly, in the above, descriptions were made for receiving of broadcasts in the region where the NTSC system, PAL-M system and PAL-N system are used. In the region where the NTSC system and PAL-M system or the NTSC system and PAL-N system are used, the object of the present invention can be achieved by using only the first status detecting circuit 100.

On the other hand, in the region where the NTSC system and PAL-N system or the PAL-M system and PAL-N system are used, the object of the present invention can be achieved by using only the second status detecting circuit 200.

In the present invention, only vertical synchronizing signals were used for the second status detecting circuit 200, but those having ordinary skill in the art will be able to achieve the same effect by using horizontal synchronizing signals.

Further, the first, second and third status detecting circuits 100, 200 and 300 were specifically described in the above, but the constitution of them does not have to be the same as the disclosed embodiment. They can be formed into an automatic broadcasting system discriminating apparatus by generally utilizing color burst recognizing signals, and vertical and horizontal synchronizing signals.

What is claimed is:

1. An apparatus for automatically discriminating from among a plurality of broadcasting systems, comprising:
   a first status detecting circuit for discriminating a broadcasting system based on color burst signals, including an inverter circuit for inverting the phase of color burst recognizing pulses; a clamping circuit for removing predetermined level signals from the output signals of said inverter circuit; a first mono-stable multi-vibrator for outputting rectangular signals having a predetermined duty ratio in accordance with output signals of said clamping circuit; a first integrating circuit for integrating said rectangular signals outputted from said first mono-stable multi-vibrator; and a first comparator for comparing the output signals of said first integrating circuit with a predetermined reference voltage to output broadcasting system discriminating signals;
   a second status detecting circuit for discriminating a broadcasting system based on synchronizing signals, including a bistable multi-vibrator for outputting rectangular signals in accordance with synchronizing signals of input image signals; a second mono-stable multi-vibrator for outputting rectangular signals having a predetermined duty ratio in accordance with the output signals of said bistable multi-vibrator; an exclusive OR gate for receiving output signals of said bistable multi-vibrator and output signals of said second mono-stable multi-vibrator to output logic signals; a third mono-stable multi-vibrator for outputting rectangular signals in accordance with the output signals of said exclusive OR gate; a second integrating circuit for integrating the rectangular signals outputted from said third mono-stable multi-vibrator; and a second comparator for comparing the output signals of said second integrating circuit with a predetermined reference voltage to output broadcasting system discriminating signals; and
   a third status detecting circuit for discriminating a broadcasting system based on outputs of said first and second status detecting circuits.

2. An apparatus for automatically discriminating from among a plurality of broadcasting systems, comprising:
   a first status detecting circuit for discriminating a broadcasting system based on color burst signals, including an inverter circuit for inverting the phase of color burst recognizing pulses; a clamping circuit for removing predetermined level signals from the output signals of said inverter circuit; a first mono-stable multi-vibrator for outputting rectangular signals having a predetermined duty ratio in accordance with output signals of said clamping circuit; a first integrating circuit for integrating said rectangular signals outputted from said first mono-stable multi-vibrator; and a first comparator for comparing the output signals of said first integrating circuit with a predetermined reference voltage to output broadcasting system discriminating signals;
   a second status detecting circuit for discriminating a broadcasting system based on synchronizing signals; and
   a third status detecting circuit for discriminating a broadcasting system based on outputs of said first and second status detecting circuits.

3. An apparatus for automatically discriminating from among a plurality of broadcasting systems, comprising:
   a first status detecting circuit for discriminating a broadcasting system based on color burst signals;
   a second status detecting circuit for discriminating a broadcasting system based on synchronizing signals, including a bistable multi-vibrator for outputting rectangular signals in accordance with synchronizing signals of input image signals; a second mono-stable multi-vibrator for outputting rectangular signals having a predetermined duty ratio in accordance with the output signals of said bistable multi-vibrator; an exclusive OR gate for receiving output signals of said bistable multi-vibrator and output signals of said second mono-stable multi-vibrator to output logic signals; a third mono-stable multi-vibrator for outputting rectangular signals in accordance with the output signals of said exclusive OR gate; a second integrating circuit for integrating the rectangular signals outputted from said third mono-stable multi-vibrator; and a second comparator for comparing the output signals of said second integrating circuit with a predetermined reference voltage to output broadcasting system discriminating signals; and
   a third status detecting circuit for discriminating a broadcasting system based on outputs of said first and second status detecting circuits.

* * * * *